Patented Mar. 31, 1925.

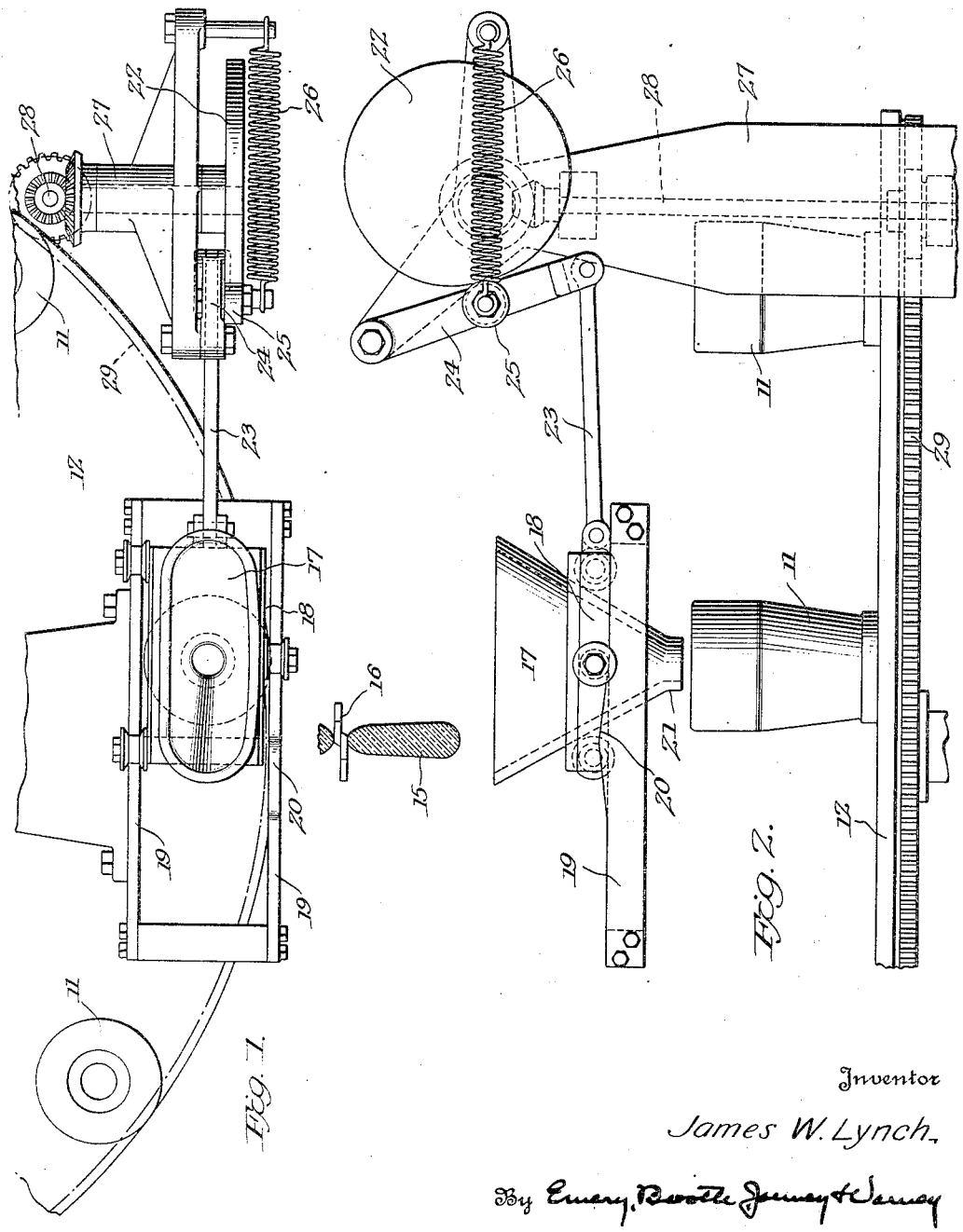

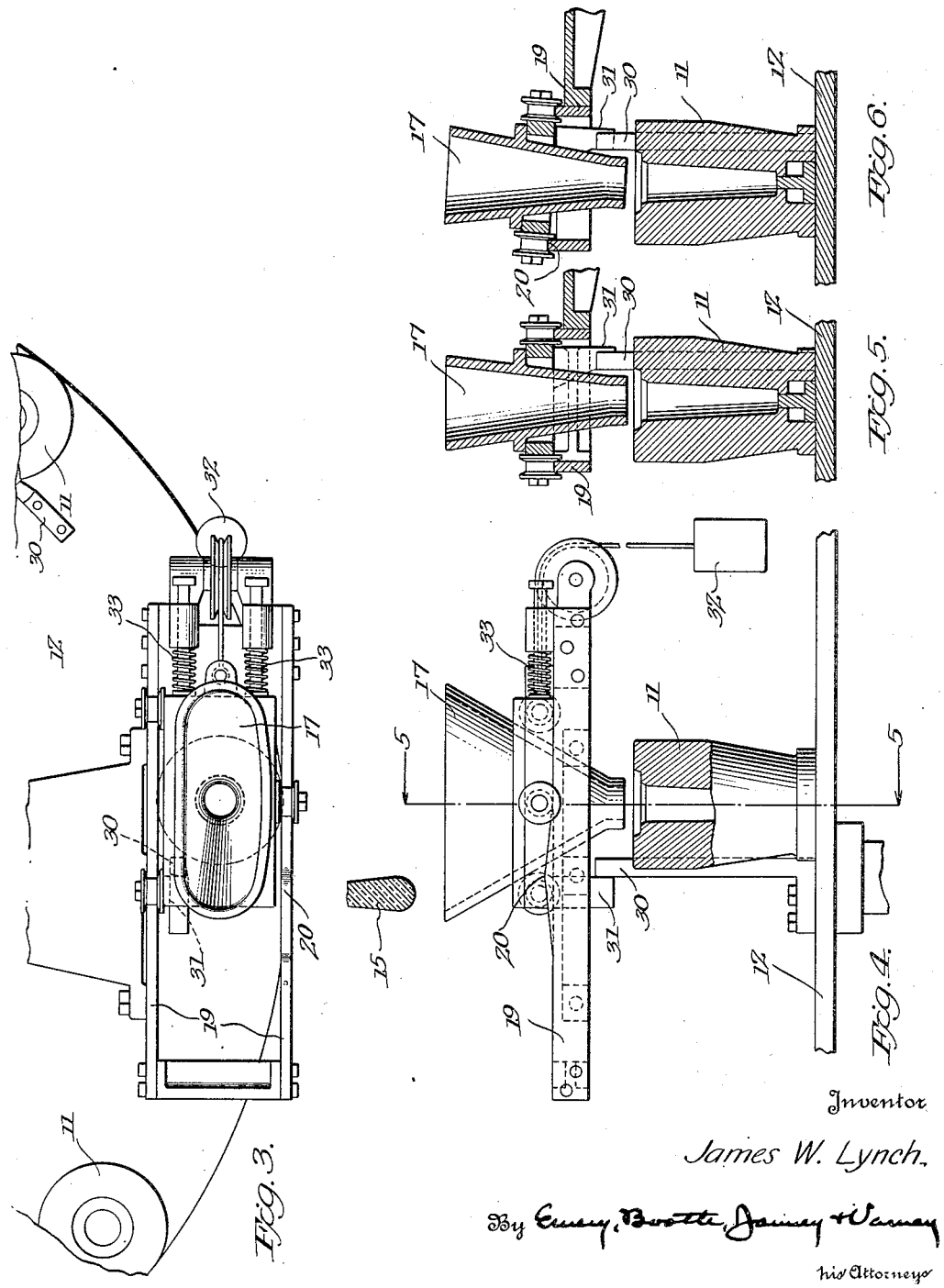

1,531,560

UNITED STATES PATENT OFFICE.

JAMES W. LYNCH, OF ANDERSON, INDIANA, ASSIGNOR TO LYNCH GLASS MACHINERY COMPANY, OF ANDERSON, INDIANA, A CORPORATION OF INDIANA.

TRAVELING FUNNEL GUIDE FOR GLASS-FORMING MACHINES.

Application filed April 11, 1924. Serial No. 705,729.

*To all whom it may concern:*

Be it known that I, JAMES W. LYNCH, a citizen of the United States, residing at Anderson, in the county of Madison and State of Indiana, have invented an Improvement in Traveling Funnel Guides for Glass-Forming Machines, of which the following description, in connection with the accompanying drawings, is a specification, like characters on the drawings representing like parts.

This invention relates to feeding charges of molten glass from a tank to the molds of glass forming machines, more particularly of the type having continuously moving molds traveling in a circular path.

The invention aims to provide automatic means for guiding the " gobs " or " gathers " of glass, which are cut off in quick succession from a valve controlled intermittent or freely falling stream issuing from the tank by any suitable severing means, commonly designated a " feeder," into the moving molds as they pass successively beneath the orifice from the tank.

Other aims and advantages of the invention appear in connection with the description of the illustrative embodiment of the invention shown in the drawings, wherein—

Fig. 1 is a plan view of the device applied to a rotary type of glass forming machine, showing the device in its normal position ready for cooperating with a mold to be charged with glass;

Fig. 2 is a side view of the same;

Fig. 3 is a plan view of another means of operating the funnel guide, showing a portion of the rotating table carrying the molds;

Fig. 4 is a side view of the same;

Fig. 5 is a vertical cross-section of the device shown in Fig. 4, on the line 5—5; and Fig. 6 is a view similar to Fig. 5, showing the parts at the mid position of the guiding movement of the funnel, showing the funnel tilted to keep its discharge outlet in line with the opening in the top of the mold.

Glass forming machines heretofore in successful use with automatic devices for feeding them glass direct from the tank have generally been intermittent in their mode of operation, the molds being filled with glass while stationary. This mode of operation is hard on the machinery and slow, as it necessitates repeated starting and stopping. In the glass forming machine shown in the drawings for illustrating one mode of performing the invention, the molds 11 are mounted on a continuously rotating table 12 or support of any suitable kind, and are successively brought beneath the orifice of the glass melting tank or container for receiving their charges of molten glass. This is periodically cut off in the shape of drops 15, called " gobs " or " gathers " by shears 16 operated by any suitable mechanism, known as a " feeder." The " feeder " apparatus for cutting off the drops at required intervals and in suitable shapes for proper working in the glass forming machine forms no part of this invention.

The device shown in Figs. 1 and 2, consists of a funnel 17, preferably elongated in the direction of movement of the table, which is mounted on a movable carrier 18 supported on wheels on the trackway 19 to run back and forth in a path substantially parallel to the direction of movement of the adjacent edge of the table. Midway of the outer rail of the trackway is a hump 20 which raises the outer side of the carrier as it passes over it and causes the depending spout 21 of the funnel 17 to swing outwards sufficiently to keep it over the opening of the mold as it follows its circular path. The vertical curvature of this portion of the outer track is such as to tilt the funnel just enough to keep its spout in vertical alinement with the circle in which the molds move.

The funnel carrier is caused to move to and fro on its track so as to follow each mold in succession by means of a cam 22, to which it is operatively connected by a link 23 and lever arm 24, which carries the cam roller 25, and which is held against the cam by means of a spring 26. The cam 22 is mounted on a shaft journaled in suitable bearings on a pedestal or bracket 27 and driven by bevel gears or other suitable means from a vertical shaft 28 which is geared to rotate in synchronism with the large gear 29 for rotating the table 12. The gearing between the table and cam is so contrived as to rotate the cam once for each mold that is carried past the glass charging position.

In the modification shown in Figs. 3, 4 and 5, the mold carrier is moved in synchronism with the molds by movement of the mold table 12, which carries adjacent to each mold an upwardly projecting spring finger 30 or other suitable abutment having a driving face for engaging a latch portion 31 of the carrier 18 or funnel 17 to slide the latter in time with the mold as each mold passes the feeding position. At the end of the sliding movement the latch 31 following its straight line path passes out of engagement with the finger 30, whereupon the weight 32 returns the carrier and funnel to normal position. The return movement of the carrier is cushioned by the stop springs 33.

The funnel is of sufficient width of opening at its top to catch the drop of glass in whatever position it may be when the drop is sheared off, and as the lower end of the funnel is shaped to conform to the opening into the mold and is constrained to follow the circular path of the molds, the drop will be guided into the mold.

The operation of the guide funnel is entirely automatic, and timed to suit the speed of operation of the machine; and the arrangement of the springs and cushioning devices for moving the funnel arm is such as to permit of high speed of operation without excessive shock upon the operating parts.

The invention is not restricted to the forms and arrangement of parts shown, but may be adapted to forming machines of various types having continuously moving molds.

I claim the following as my invention:

1. A traveling funnel guide for forming machines having moving molds traveling in a curvilinear path comprising a funnel carrier, a track adjacent to a portion of said path upon which said carrier is movable, a funnel mounted on said carrier, said funnel having an elongated hopper and a spout arranged above the plane of the filling openings of said molds, means to reciprocate said carrier and funnel to and fro on said track to coincide with the passage of successive molds, and means for tilting said funnel carrier as it moves to and fro to swing the funnel spout laterally sufficiently to keep it in alinement with the path of movement of said molds.

2. A traveling funnel guide for forming machines having moving molds traveling in a curvilinear path comprising a funnel carrier, a pair of rails adjacent to a portion of said path upon which said carrier is movable, a funnel mounted on said carrier, said funnel having an elongated hopper and a spout arranged above the plane of the filling openings of said molds, means to reciprocate said carrier and funnel to and fro on said rails to coincide with the passage of successive molds, and means on one of said rails for tilting said funnel carrier as it moves to and fro to swing the funnel spout laterally sufficiently to keep it in alinement with the path of movement of said molds.

3. A traveling funnel guide for forming machines having moving molds traveling in a curvilinear path comprising a funnel carrier, a pair of rails adjacent to a portion of said path upon which said carrier is movable, a funnel mounted on said carrier, said funnel having an elongated hopper and a spout arranged above the plane of the filling openings of said molds, means to reciprocate said carrier and funnel to and fro on said rails to coincide with the passage of successive molds, and one of said rails having a raised portion for tilting said funnel carrier as it moves to and fro to swing the funnel spout laterally sufficiently to keep it in alinement with the path of movement of said molds.

4. A traveling funnel guide for forming machines having molds traveling in a curvilinear path comprising a runway alongside said path, a tilting funnel mounted on said runway having an elongated hopper and a discharge spout, and means for moving said funnel and swinging said spout in coincidence with a moving mold.

5. A traveling funnel guide for forming machines having molds moving in a curvilinear path comprising a trackway 19 having an elevated portion 20, a carrier 18 mounted for reciprocation on said trackway, a funnel 17 on said carrier having a spout 21 above said path, said spout projecting below said trackway in proximity with the filling openings of said molds, and means for reciprocating said carrier in time with the passing molds, whereby said funnel spout is tilted to follow said curvilinear path.

6. In combination with a feeder for glass forming machines comprising molds moving in a curvilinear path, a runway passing below the feeder outlet, a funnel provided with an elongated hopper and a center spout mounted on said runway, said spout being disposed below said runway and above said curvilinear path, means for moving said funnel along said runway in time with successive molds, and means carried by said runway for tilting said funnel as it moves over said molds to swing said spout crosswise of said runway to follow said curvilinear path.

In testimony whereof, I have signed my name to this specification.

JAMES W. LYNCH.